United States Patent [19]

Beattie et al.

[11] Patent Number: 4,541,545

[45] Date of Patent: Sep. 17, 1985

[54] PORTABLE FIRE RESISTANT CASE

[75] Inventors: Patrick J. Beattie, Henrietta; David O. Chase, Skaneateles, both of N.Y.

[73] Assignee: John D. Brush & Co., Inc., Rochester, N.Y.

[21] Appl. No.: 625,136

[22] Filed: Jun. 27, 1984

[51] Int. Cl.[4] ....................... B29C 23/00; B65D 25/14; B65D 25/20; B65D 55/14

[52] U.S. Cl. ........................................ 220/431; 70/84; 109/45; 109/58; 109/80; 220/88 R; 220/210; 220/444; 220/902; 264/46.6

[58] Field of Search ............. 220/444, 902, 210, 88 R, 220/430, 431, 432; 264/46.6; 70/77, 78, 84; 109/78, 77, 80, 84, 58, 79, 49, 45

[56] References Cited

U.S. PATENT DOCUMENTS

| | | | |
|---|---|---|---|
| 328,113 | 10/1885 | Farrel | 109/84 X |
| 1,029,364 | 6/1912 | Hartwis | 109/84 X |
| 1,688,106 | 10/1928 | Bates, Jr. | 109/77 |
| 1,916,752 | 7/1933 | Carlson | 109/84 |
| 2,526,036 | 10/1950 | Morrison | 220/432 X |
| 2,809,764 | 10/1957 | Diamond | 220/431 |
| 3,091,946 | 6/1963 | Kesling | 264/46.6 X |
| 3,339,781 | 9/1967 | Schurman et al. | 220/469 |
| 3,406,229 | 10/1968 | Cenesy | 264/46.5 |
| 3,702,592 | 11/1972 | Gamble | 109/84 X |
| 3,739,936 | 6/1973 | Jones, Jr. | 220/229 X |
| 3,868,152 | 2/1975 | Dixon | 220/430 X |

FOREIGN PATENT DOCUMENTS

| | | | |
|---|---|---|---|
| 2351027 | 12/1977 | France | 220/444 |

*Primary Examiner*—Allan N. Shoap
*Attorney, Agent, or Firm*—Stonebraker, Shepard & Stephens

[57] ABSTRACT

A portable fire resistant case 10 is made with a molded, double-walled resin body 11 and cover 12 hinged and locked together and filled with insulation in the spaces between the double walls. Spring latches 30 mounted on body 11 engage interlock surfaces 33 on cover 12 to hold cover 12 to body 11 independently of the hinge and are assisted in this by a lock element 27 engaging and holding projections on the inside of body 11. Body 11 and cover 12 are formed with molded filling projections 19 and 20 forming passageways into cavities **11*c* and 12*c* that are filled with insulation through filling projections 19 and 20. Projections 19 and 20 and overfilled insulation material that they contain are cut away after the insulation has set to leave insulation stubs 23 and 24 over which escutcheons 25 and 26 are mounted on the lock side of case 10**.

15 Claims, 4 Drawing Figures

PORTABLE FIRE RESISTANT CASE

BACKGROUND

A need exists in the fire resistant safe market for a portable case that can withstand a half-hour fire test and be light enough and small enough to be readily carried about. Such a portable fire resistant case, to be successful, must also sell at a low price. Applying the technology of larger fire resistant safes to a portable case would result in a product that is too heavy and too expensive to succeed.

We have devised a way of making a portable fire resistant case inexpensively in a suitable size and weight to be carried about and yet insulated sufficiently to withstand a half-hour fire test. Our case combines several features that make it fire resistive and conveniently portable, and our invention includes a method of economically manufacturing our fire resistant case.

SUMMARY OF THE INVENTION

Our portable fire resistant case has a molded double-walled resin body and cover with insulation filling the spaces between the double walls. Outwardly, it resembles an attache case with the cover hinged to the body on one side and the cover and body locked together on the opposite side. The lock element holding the cover and body together is disposed inside the case.

An interlocking device mounted on the inside of the hinge side of the body interlocks with an inside surface of the cover when the cover is closed to hold the cover and body together independently from the hinge and lock. The lock sides of both the body and the cover have an outward extending filling projection through which the body and cover are filled with insulation. After the insulation has set, the filling projections and the overfilled insulation they preferably contain are cut off, leaving projecting stubs of insulation material surrounded by resin wall material. Injection molded resin escutcheons are fitted over these stubs and fastened respectively to the body and cover, and the escutcheon for the body preferably includes a lock and handle. Even though the exterior of the finished case is formed of resin material that burns away in a fire, the lock element and interlock device hold the cover and body together independently of the hinge so that the case can withstand a half-hour fire test.

DRAWINGS

DETAILED DESCRIPTION

Figure 2:
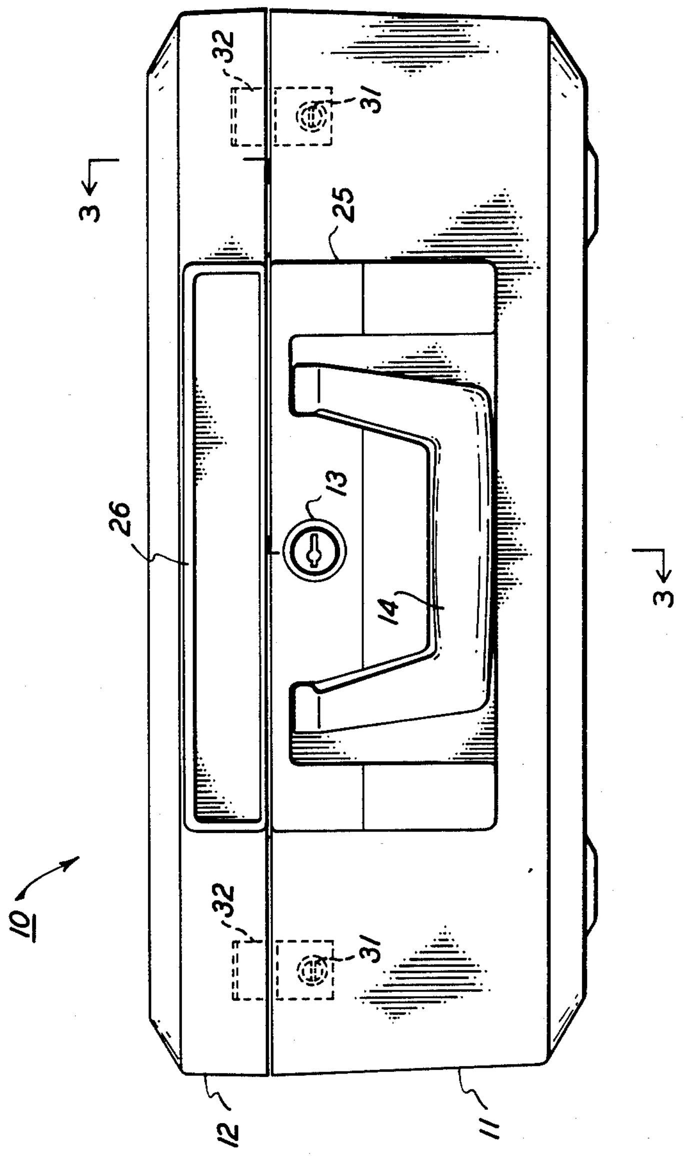
FIG. 2 is a front elevational view of a preferred embodiment of our portable fire resistant case.
Figure 3:
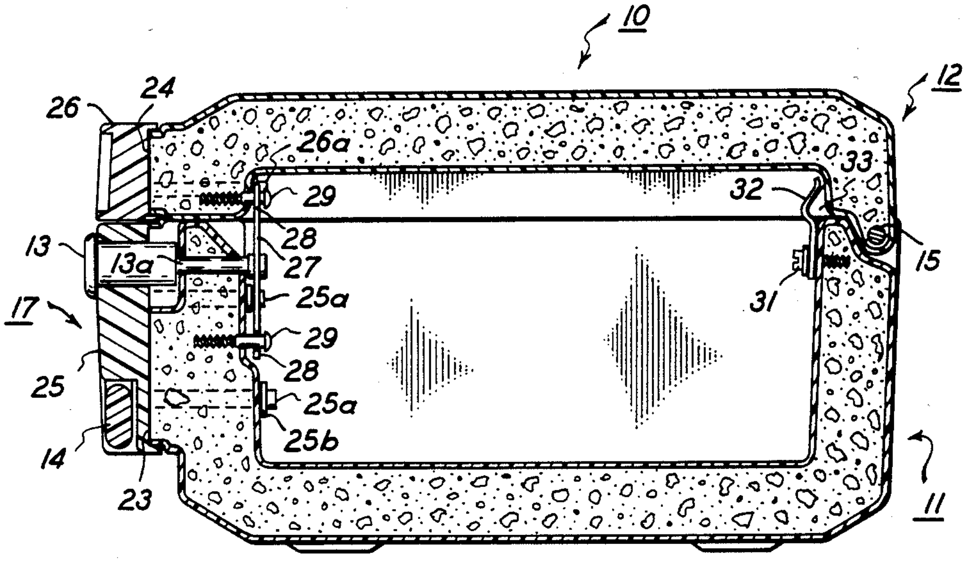
FIG. 3 is a cross-sectional view of the case of FIG. 2, taken along the line 3—3 thereof.
Figure 4:
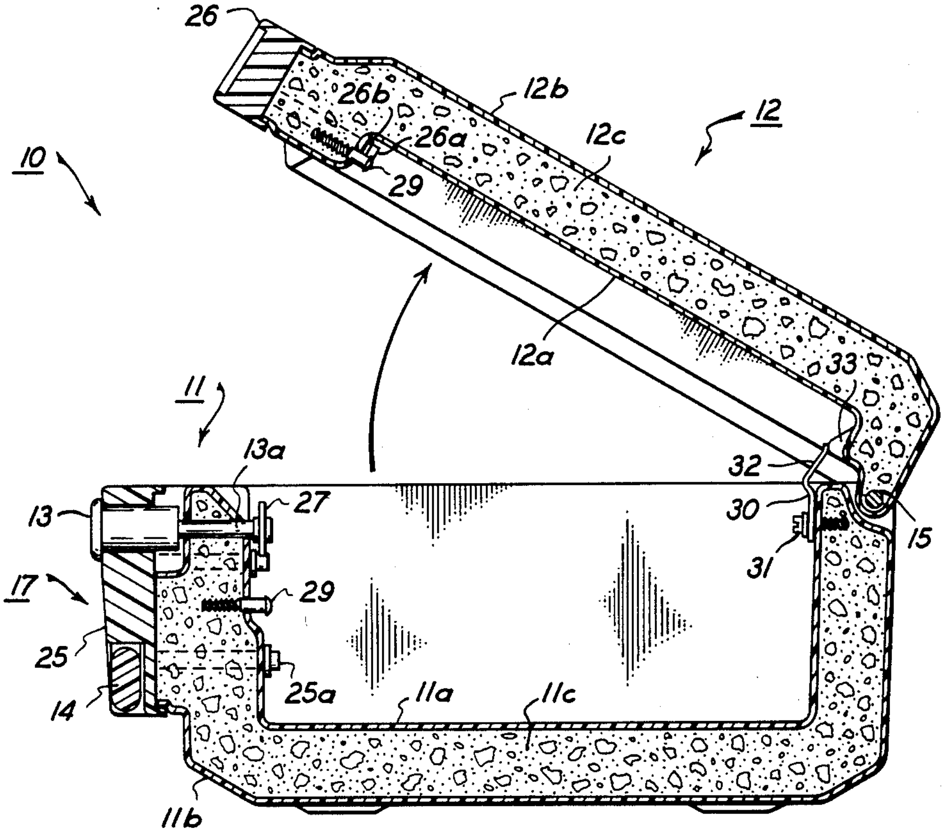
FIG. 4 is a cross-sectional view, similar to the view of FIG. 3, showing the case cover partly open.

Our portable fire resistant case 10, as best shown in FIGS. 2–4, has an attache case-like body 11, hinged cover 12, lock 13, and carrying handle 14. Otherwise, case 10 combines features that enable it to survive a half-hour fire test so that it can provide fire resistant storage of valuables. The standard half-hour UL fire test is 30 minutes exposure to an ambient temperature of 1550° F. with the interior of the case not exceeding 350° F.

Body 11 and cover 12 are each molded of resin material to form inner walls 11*a* and 12*a* and outer walls 11*b* and 12*b* that are spaced apart to enclose cavities 11*c* and 12*c*. We prefer blow molding body 11 and cover 12 in single pieces, but injection molding of separate inner and outer walls is also possible. However formed, cavities 11*c* and 12*c* are filled with insulation material to make case 10 fire resistant. Cover 12, hinged to body 11, is also independently secured to body 11 by internal interlocks, explained more fully below, so that cover 12 stays on body 11, even while the resin exterior of case 10 burns away in a fire.

Figure 1:
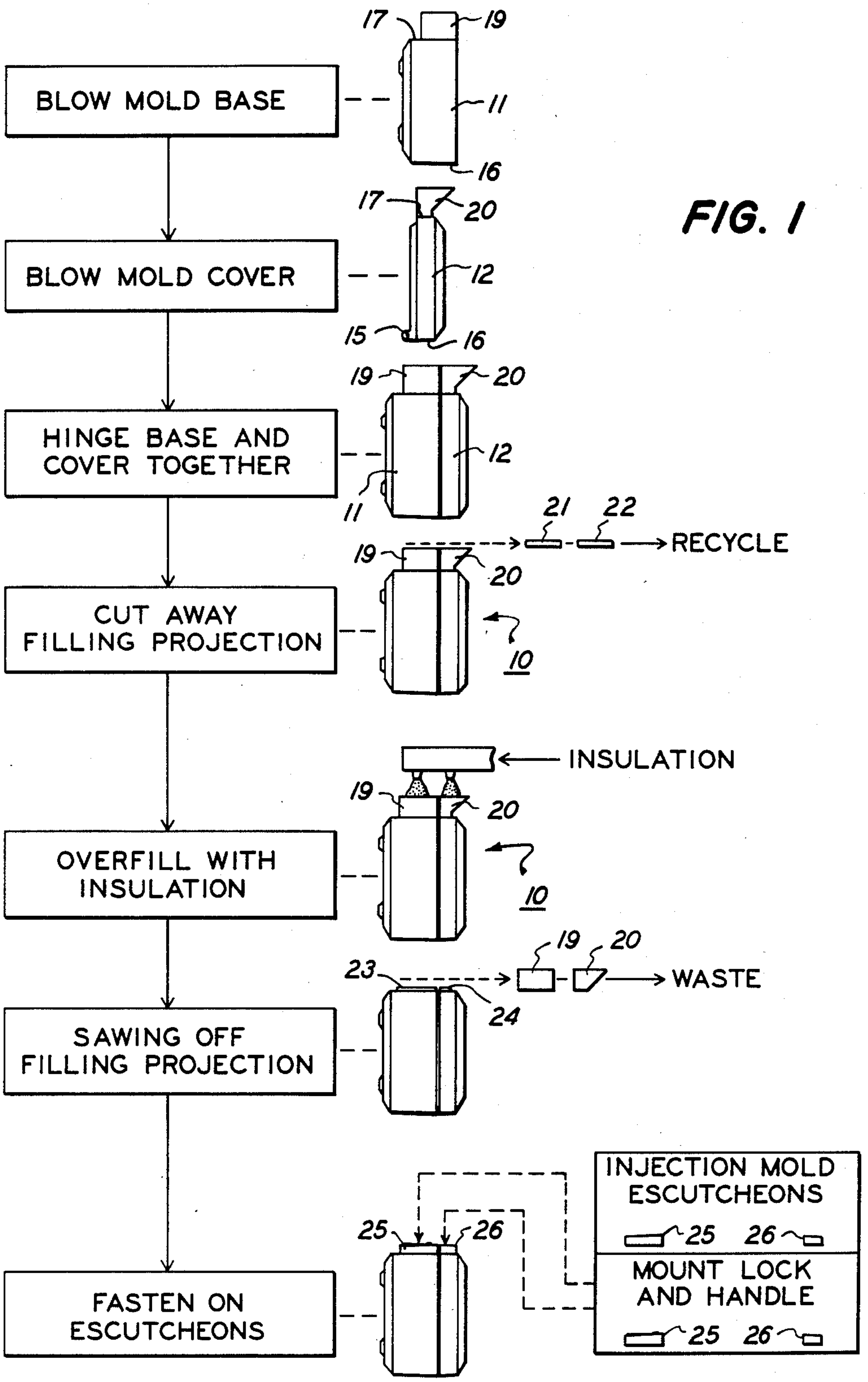
FIG. 1 is a partially schematic view of a succession of preferred steps in our inventive method.

We prefer making case 10 by the method steps schematically shown in FIG. 1. Base 11 and cover 12 are each molded as double-walled, resin bodies with cavities that can be filled with insulation. Cover 12 is preferably formed with a pair of hinge pins 15 that can fit into corresponding hinge pin sockets (not shown) on the hinge side 16 of body 11. A preferred way of hinging cover 12 to body 11, as shown in U.S. Pat. No. 4,005,800, is by assembling hinge pins 15 of a molded and cooled cover 12 into the hinge sockets of a freshly molded and still warm body 11 so that as the hinge side of body 11 cools and shrinks, it traps hinge pins 15 in body sockets, leaving cover 12 hingedly connected to body 11.

Respective filling projections 19 and 20 are formed on the lock sides 17 of body 11 and cover 12 opposite their hinge sides 16. Filling projections 19 and 20 extend outward to receive insulation that flows into cavities 11*c* and 12*c* between the double walls of body 11 and cover 12 for filling case 10 with insulation.

To accomplish this, the outer ends 21 and 22 of projections 19 and 20 are cut off or formed to open passageways extending through filling projections 19 and 20 and into cavities 11*c* and 12*c*. Enough insulation is then poured through projections 19 and 20 to overfill cavities 11*c* and 12*c* and rise into filling projections 19 and 20. After the insulation has set, filling projections 19 and 20 and the overfilled insulation they contain are cut off, preferably by sawing, to leave projecting stubs 23 and 24 of insulation material surrounded by resin wall material.

Resin escutcheons 25 and 26 are preferably injection molded to fit over stubs 23 and 24 and are fastened respectively to base 11 and cover 12 where they enclose, conceal, and seal stubs 23 and 24. Escutcheons 25 and 26 make the lock side 17 of case 10 attractive and hide the means by which body 11 and cover 12 are filled with insulation. They also seal the insulation stubs 23 and 24 against vapor loss, and escutcheon 25 on body 11 preferably mounts lock 13 and handle 14.

Using molded filling projections 19 and 20 that are overfilled with insulation allows insulation cavities to be filled without spilling and eliminates the expense of cleanup that is necessary when insulation is poured through a hole in a safe wall. The convenience of filling projections 19 and 20 adds only slight extra expense when body 11 and cover 12 are blow molded of resin material. Using the insulation stubs 23 and 24 that result from filling the insulation through projections 19 and 20 as mounts for escutcheons 25 and 26 adds to the advantage of our preferred method.

A simple way that we prefer for mounting escutcheons 25 and 26 is by integrally molded escutcheon pins 25*a* and 26*a* extending through bore holes in the lock side 17 of case 10 to receive push nuts **25*b* and 26*b* pressed against inside walls 11*a* and 12*a*. Lock 13 is preferably mounted on escutcheon 25 before assembly on body 11 so that a rotatable lock spindle 13*a* extends through another bore hole in the lock side 17 of body 11. The inboard end of lock spindle 13*a*, when in a locked position, mounts a lock element 27 having end hooks 28 that engage and interlock with shoulder screws 29 threaded into the insides of body 11 and cover 12**.

At the hinge side of case 10, a pair of spaced-apart resilient latches 30 are mounted on body 11 with screws 31 so that their spring ends 32 angle upward. The inside wall **12*a* of cover 12 has a corresponding pair of interlock surfaces 33 that angle inward to be engaged by spring ends 32 when cover 12** is closed.

The combination of lock element 27 hooked against shoulder screws 29 in a locked position and spring ends 32 engaging cover latch surfaces 33, all on the inside of case 10, interlocks cover 12 and body 11 even after the resin exterior and hinge of case 10 have burned away in a fire. The insulation resists heat penetration into the interior of case 10 where the interlock devices are mounted; and for at least the duration of a half-hour fire test, the interior temperature of case 10 does not go high enough to disable the interlocks formed by latches 30 and lock element 27.

We claim:

1. A system of making a case fire resistant, said system comprising:

a. molded resin forms having double walls defining cavities respectively shaped to form a body and cover for said case;

b. filling projections formed in said walls of said forms to communicate with said cavities;

c. said cavities being filled with fire resistant insulation material cast in said forms to enclose the interior of said case and partially fill said filling projections;

d. said filling projections being cut away to leave exposed insulation bounded by said resin walls; and e. resin material covering said exposed insulation for sealing and concealing said insulation material.

2. The system of claim 1 wherein said filling projections are formed in outer walls of said forms and cut away to leave stubs projecting from said outer walls, and said resin material covering said stubs is formed as molded resin escutcheons.

3. The system of claim 2 wherein said stubs for said body and cover are adjacent each other when said cover is closed against said body.

4. The system of claim 2 wherein said stubs have through bores and said escutcheons have pins extending through said bores and secured on the interior of said case.

5. The system of claim 4 including a lock mounted on one of said escutcheons, internally projecting pins on said body and said cover, and said lock being arranged to engage said pins for holding said cover closed against said body.

6. In a case having a body and a cover that can be held releasably closed together, an improvement making said case fire resistant, said improvement comprising:

a. molded resin forms having double walls defining cavities respectively shaped to form said body and said cover and having filling openings communicating with said cavities;

b. fire resistant insulation material filling said cavities in said body and cover and extending into said filling openings;

c. severed stubs of said insulation material remaining in said filling openings; and d. resin material covering and sealing said severed stubs.

7. The improvement of claim 6 wherein said severed stubs extend outward from outer walls of said body and cover, and said resin material covering and sealing said severed stubs is formed as molded resin escutcheons.

8. The improvement of claim 7 wherein said stubs have through bores and said escutcheons have pins extending through said bores and secured on the interior of said case.

9. The improvement of claim 7 including a lock mounted on one of said escutcheons, lock pins respectively mounted on the interior of said body and said cover, and said lock engaging said lock pins for holding said cover closed against said body.

10. The improvement of claim 6 wherein said severed stubs are adjacent each other when said cover is closed against said body.

11. A method of making a case fire resistant, said case having a body and cover that can be held releasably closed together, said method comprising:

a. molding forms for said body and cover of resin material having double walls defining cavities in the shapes of said body and cover and having filling projections communicating with said cavities;

b. flowing fire resistant insulation material through said filling projections and into said cavities to fill said cavities and portions of said filling projections;

c. after said insulation material is set, cutting off said filling projections and said insulation material in said filling projections to leave severed stubs of exposed insulation bounded by said forms; and d. securing resin material over said severed stubs for covering and sealing said insulation material.

12. The method of claim 11 including hingedly connecting said body and cover before filling said cavities with said insulation material, and disposing said body and cover filling projections adjacent each other when said cover is closed against said body.

13. The method of claim 11 including boring holes through said severed stubs and forming said covering resin material as molded escutcheons having pins that extend through said holes and are secured on the inside of said body and cover.

14. The method of claim 11 including forming lock pins on the interior of said body and cover and mounting a lock to engage said lock pins for holding said cover closed against said body.

15. The method of claim 11 including blow molding said resin forms for said body and cover and cutting away resin material from outer ends of said filling projections to open passageways extending through said filling projections to said cavities.

* * * * *